United States Patent [19]

Bauer

[11] 4,447,981
[45] May 15, 1984

[54] LEVEL-TRAVELLING FISHING LURE

[76] Inventor: Paul E. Bauer, 20204 Indian Hollow Rd., Wellington, Ohio 44090

[21] Appl. No.: 388,887

[22] Filed: Jun. 16, 1982

Related U.S. Application Data

[63] Continuation-in-part of Ser. No. 192,649, Oct. 10, 1980, abandoned.

[51] Int. Cl.³ .............................................. A01K 85/00
[52] U.S. Cl. .................................... 43/42.21; 43/42.36
[58] Field of Search ................. 43/42.09, 42.39, 42.19, 43/42.23, 42.21, 42.35, 42.36

[56] References Cited

U.S. PATENT DOCUMENTS

| | | | |
|---|---|---|---|
| 2,007,045 | 7/1935 | Francis | 43/42.39 |
| 2,482,648 | 9/1949 | Brandt | 43/42.19 |
| 2,674,823 | 4/1954 | Gellings | 43/42.19 |
| 2,796,695 | 6/1957 | Meulnart | 43/42.19 |
| 3,137,960 | 6/1964 | Sharp | 43/42.09 |
| 3,393,465 | 7/1968 | Powell | 43/42.39 |
| 3,868,784 | 3/1975 | Sabol | 43/42.23 |
| 4,121,366 | 10/1978 | McClellan | 43/42.09 |

FOREIGN PATENT DOCUMENTS 538246 of 1957 Canada .............................. 43/42.19

Primary Examiner—Kuang Y. Lin
Assistant Examiner—Kurt Rowan
Attorney, Agent, or Firm—Alfred D. Lobo

[57] ABSTRACT

A forward-weighted fishing lure is disclosed which will travel level underwater when drift-fishing from a boat, or even when the lure is simply hanging from a float of "bobber". The lure will also travel level underwater when it is retrieved or trolled. The lure comprises an elongate heavy body, a wire member protruding from the tail portion of the body, a spinner and a fish hook at the end of the wire member which fish hook is spaced from the spinner by spaced beads. The body is provided with a generally T-shaped cavity in which the wire member is removably inserted until an eyelet in the wire member protrudes from the body's upper portion at the balance point of the lure, so that the lure will be level when suspended underwater by a fishing line attached to the eyelet. The parts of the lure are interchangeable. The lure moves through the water with a swimming action simulating a minnow while utilizing even a slow water current so as to induce fish-attracting spinner action.

2 Claims, 3 Drawing Figures

LEVEL-TRAVELLING FISHING LURE

CROSS-REFERENCE TO RELATED APPLICATION

This is a continuation-in-part application of Ser. No. 192,649 filed Oct. 10, 1980 now abandoned.

BACKGROUND OF THE INVENTION

There are many artificial lures (hereafter "lures" for brevity) used to catch fish by casting a line with a spinning rod, casting rod, or spin-casting rod. Among the different types of lures used, there are floating lures which are 'worked' on the surface of the water; hollow lures, and solid lures (that is, cavity-free and not hollow), which may not float by themselves, and which are worked under the surface of the water ("underwater"). By "worked" I refer to manipulation of the rod and line by the angler in such a way as to impart movement to the lure with the expectation that such movement might attract the attention of fish. Each lure is constructed for a special action, and purposely to duplicate special condition, so that a fish will be impelled to strike the lure.

This invention relates particularly to lures with a cavity therein, and still more particularly to forward-weighted lures of the type having an elongate body and spinner blade (hereafter "spinner") each having a density greater than that of water, which lure is fished by moving it in a generally horizontal attitude through the water to give the lure the desired fish-attracting action. Such movement is typically provided either by trolling the lure behind a moving boat, or retrieving the lure at a drift-fishing speed so that sufficient speed is given the lure irrespective of how such speed is generated. A lure is trolled at an essentially constant distance from the boat and its speed through the water is determined by the speed of the boat. A lure is retrieved after it is cast, by manually reeling it in with a reel on a rod. By "sufficient speed" I refer to a speed at which the lure travels in a generally horizontal disposition with the spinner spinning so as to create the requisite flash in the water to attract fish. In commonly used forward-weighted lures, the fishing line is attached to an eyelet (hereafter "line eyelet") provided at one end (the nose, or front end) of the lure, and the hook is attached to an eyelet ("hook-attaching eyelet") at the other end (tail portion), with the weighted body between the ends. To maintain the conventional spinner type lure in the horizontal attitude, it is critical that the lure travel in the water at sufficient speed, as defined hereinabove.

Since retrieving a lure manually at sufficient speed is arduous and requires considerable concentration on the part of the fisherman, he usually prefers to troll the lure behind a motor-boat. Over a period of a few hours this procedure consumes several gallons of gasoline which is getting progressively more expensive even when it is available. It is much more desirable to fish without running the motor on the boat, that is, to drift fish, with or without a bobber. Since a boat generally drifts relatively slowly, that is at a drifting velocity in the range from about 1 mile per hour (mph) to about 8 mph, under normal wind and current conditions, it becomes important that the lure attract fish at drifting velocity. A typical lure used with a spinning or casting rod at drifting velocity results in the lure dangling in the water with an angular orientation greater than about 45° from the horizontal, and more generally, in a nearly upright position, that is, with the body of the lure nearly directly above the spinner, with the hook hanging at the bottom. In this attitude the lure cannot and does not provide the action or turbulence to attract fish.

Various lures have been designed to be fished at drifting velocity. For example, U.S. Pat. No. 3,828,463 discloses a combination of weight member and hollow body, angled relative to each other, and with an eyelet for attaching the fishing line placed intermediate the weight member and hollow body. U.S. Pat. No. 3,858,343 teaches a lure with a weighted member and a body portion including plastic strands which camouflage a fish hook. A spinner blade is spaced apart from the body portion in front of it, and the fishing line is attached intermediate the body portion and weighted member.

There are relatively few spinner type lures (that is, having spinner blades) of the type having an elongate heavy body which by itself provides the necessary weight to give a lure the forward weight required to imbue it with a swimming movement simulating that of a minnow. Such lures are distinct from those generally referred to as "jigs" which are relatively small, weighted lures for underwater use, in which lures a metal or other heavy material is molded around the upper shank portion of a fishing hook. Such jigs are disclosed in U.S. Pat. Nos. 2,538,484; 3,193,963; 3,922,811 and 3,959,060. These jigs are typically provided with an eyelet protruding from intermediate the main body, to which eyelet a fishing line is attached in the usual manner. These jigs are, as the term implies, fished by "jigging" them, that is, giving them a sporadic, darting, generally erratic movement, rather than a relatively steady linear movement characteristic of a lure with a spinner which is spaced apart from a hook with beads or other spacer means.

A lure is disclosed in U.S. Pat. No. 2,239,802 which seeks to produce a gliding or darting of the lure in an arcuate path, and when the lure is used for trolling, a combined darting and wriggling movement is produced. To do so, the lure is necessarily winged and is not of the spinner type, so that its action is quite different from that provided by an unwinged spinner type lure. Moreover, though it teaches a central line attaching eyelet so the lure can be used in a still-fishing or very slow trolling operation and maintain a horizontal attitude, the action imparted the lure is a glide and dart action. This type of action which is imparted irrespective of which of several eyelets on the lure is used, is quite different from a side to side swimming action of a minnow.

More specifically, this invention is particularly related to a spinner type lure which, because it is primarily directed to catching fish at drift velocity, requires that the lure be laterally pivotable about a line eyelet located near the center of mass of the lure, and that the line eyelet be integrally formed with the wire shaft which is removably inserted in a cavity in the body of the lure. The wire shaft carries a spinner blade and bead spacing means spacing the body from a removably attached hook.

A lure for still-fishing with live bait and not of the spinner type, which lure recognized the problem of balancing a lure underwater, but relies on the live bait to attract the fish, is disclosed in U.S. Pat. No. 3,742,639. Spinner type lures do not rely on live bait to attract fish, though it is conventional to hook a worm, preferably hiding the hook, especially when the fish sought is a soft-striking fish like a wall-eye, rather than a hard-striking fish like a bass or salmon. For hard-striking fish the worm is unnecessary though the hook may nevertheless be camouflaged with a feather, or provided with a weed-repelling 'finger' or the like.

It will be appreciated that casting a spinner type lure any substantial distance with a large worm such as a 'nightcrawler' attached to the hook, without shredding the worm is not easy, and it is much preferred to cast the spinner and hooked worm only a relatively short distance and thereafter either drift-fish or troll the lure.

Still another lure which recognized the problem of a conventional spinner type lure angling downward due to gravity even when the lure is retrieved at relatively low speeds, is disclosed in U.S. Pat. No. 4,090,319. This lure provides a weighted member cradled between two eyelets one of which is used to attach the fishing line, and the other, at the front, is used to thread the line to give the lure the desired horizontal attitude when it is pulled through the water.

SUMMARY OF THE INVENTION

A disassemblable artifical fishing lure of the spinner type with interchangeable parts is so constructed as to allow the lure to be fished at relatively low speed underwater while it maintains a horizontal position so as to simulate the movement of a minnow. The lure allows a fisherman to drift-fish with it, yet provides the versatility which permits him to use it as a conventional spinner type lure should he wish to troll it, or manually cast and retrieve it.

It is a general object of this invention to provide a level-travelling lure of the spinner type, comprising a heavy minnow shaped wing-free body having a single fishing line connection means (hereafter "line eyelet" for brevity) protruding above about the center of mass of the body, at the balance point of the lure, so that a line attached to the line eyelet allows the lure to maintain a generally horizontal attitude underwater even when it is stationary. The body of the lure is provided with a cavity in which is removably inserted a wire shaft member, preferably of single piece construction, extending only through the tail portion of the body. A spinner blade is rotatably disposed on the wire shaft, for rotation thereabout, adjacent the tail, and is spaced apart with spacing beads or other spacing means from a removably attached fish hook at the end of the wire shaft.

It is a specific object of this invention to provide a level-travelling drift-fishing lure which simulates the swimming action of a minnow, that has a fish-attracting spinner blade action at draft fishing speed, yet will not roll or twist because of the preventive forces exerted by the fishing line attached to a central eyelet; and, in which lure the body, and wire shaft with its spinner blade and spacing beads may be interchanged for optimum colors, and the hook is interchangeable for the most desirable size.

BRIEF DESCRIPTION OF THE DRAWINGS

The foregoing and other objects and advantages of my invention will appear more fully from the following description, made in connection with the accompanying drawings of a prior art fishing lure and of the preferred embodiment of this invention, wherein like reference characters refer to the same or similar parts throughout, and in which.

DETAILED DESCRIPTION OF A PREFERRED EMBODIMENT

Figure 1:
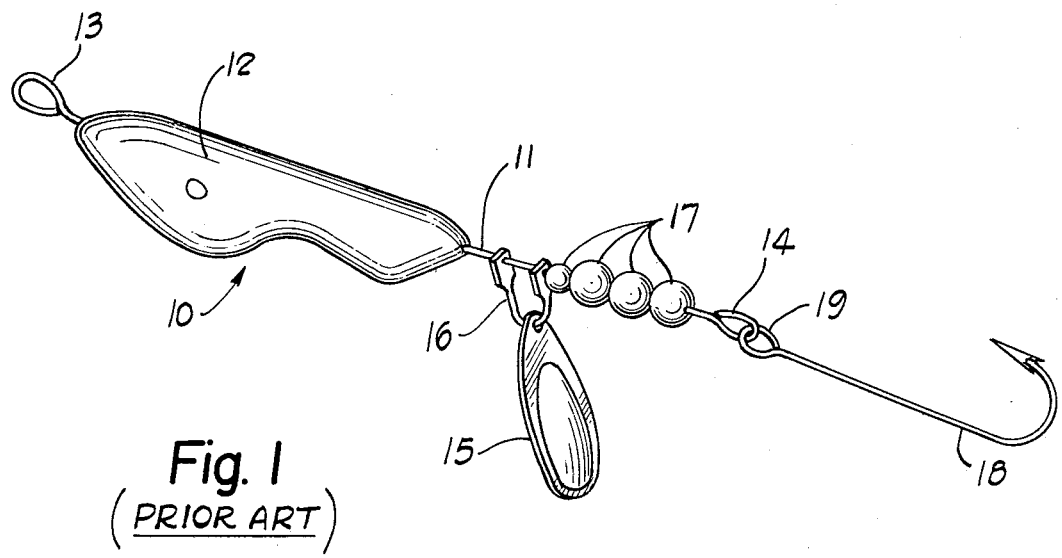
FIG. 1 is a perspective essentially side elevational view of a prior art fishing lure of the spinner type.

Referring particularly to FIG. 1 of the drawing, there is shown a conventional prior art spinner type lure indicated generally by reference numberal 10 having a wire shaft 11 on which a minnow-shaped body 12 is secured. The lure is shown in an angular orientation to illustrate the attitude it assumes when attached to a fishing line and pulled through the water at relatively low speed. When the lure is nearly stationary it will assume a generally vertical attitude, and when drawn through the water is relatively low speed, for example drifting velocity, the angle to the horizontal decreases, ranging from about 45° to nearly 90° if the lure is substantially stationary. The body has a head portion from the mouth of which, one end (the front end) of the shaft 11 protrudes, terminating in a line eyelet 13 to which a fishing line may be attached in the usual manner when the lure is used. The shaft 11 also protrudes from the tail of the body and extends for a distance about equivalent to the length of the body before it terminates in a hook-attaching eyelet 14.

Between the tail and the hook-attaching eyelet there is supported a spinner blade 15 so that it may freely rotate about the axis of the shaft. To do this, a clevis 16 to which the spinner blade 15 is attached, is loosely held on the shaft 11 so that the clevis and blade may freely rotate about the shaft as the lure is pulled through the water. The spinner is designed so that it will spin about the axis of the shaft when the lure is pulled through the water at sufficient speed, and the speed of rotation of the spinner blade increases as the velocity of the lure through the water increases.

The blade 15 on its clevis 16 are spaced from the hook-attaching eyelet 14 by means of any conventional spacer means 17, exemplified by spherical colored beads which are slidably held on the shaft 11, and which are free to rotate about the axis thereof. The number and size of the beads are not known to be critical, nor is their color, it being sufficient to provide at least three beads, and preferably from 3 to about 5 beads depending upon the overall length of the lure and the length of the shaft protruding from the tail. A hook 18 is attached to the hook-attaching eyelet 14, usually non-releasably, by means of a hook eyelet 19.

Figure 2:
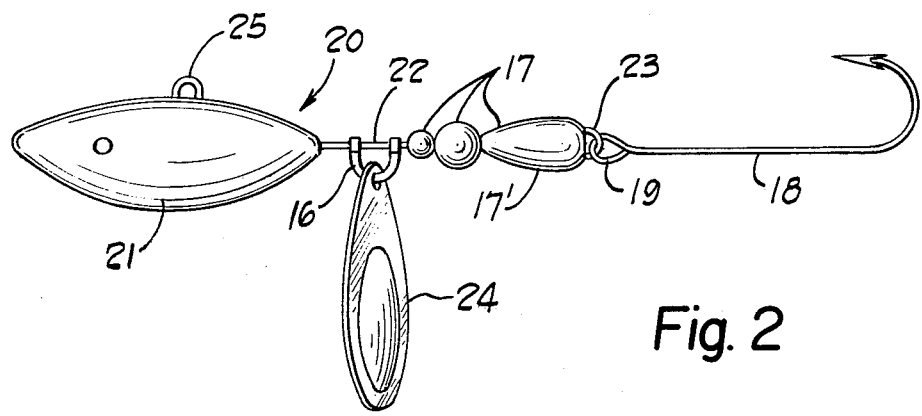
FIG. 2 is a perspective essentially side elevational view of a level-travelling spinner type lure of this invention.
Figure 3:
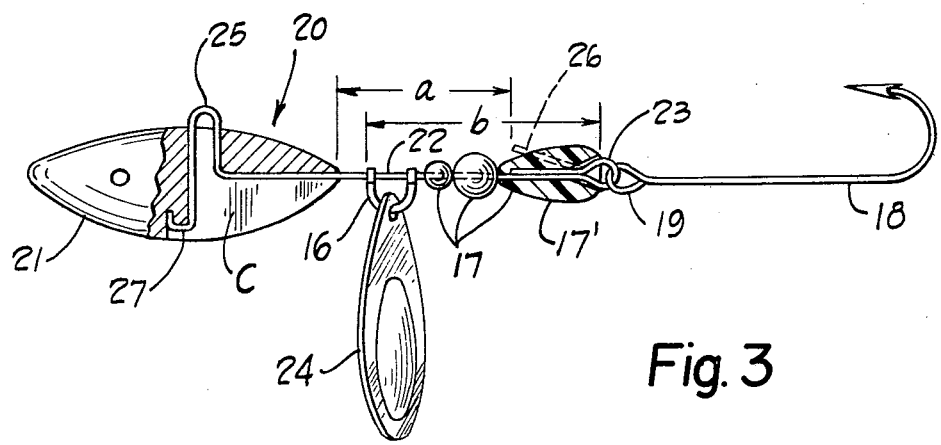
FIG. 3 is a side elevational view partly in cross-section, of FIG. 2 showing details of construction.

Referring now to FIGS. 2 and 3 of the drawing, there is shown the disassemblable artificial fishing lure of this invention indicated generally by reference numeral 20. The lure 20 is shown in a substantially horizontal attitude, which is that attitude it assumes whether it is held stationary or whether it is drawn underwater at relatively low speeds typical of drift-fishing, or even higher speeds such as those typically used to fish a conventional spinner type lure such as that illustrated in FIG. 1. The lure 20 comprises an elongate minnow-shaped body 21 having a head and tail, made of heavier than water material which is secured to a bent wire shaft 22 which protrudes from the tail of the minnow-shaped wing-free body. The shaft 22 is removably inserted in a generally T-shaped cavity C in the body and the shaft terminates in a hook-attaching eyelet 23.

Between the tail and the hook-attaching eyelet 23 there is supported a spinner blade 24 rotatably disposed on the shaft 22 so as to freely rotate about the axis thereof. As in the prior art lure described hereinabove, the spinner blade is preferably attached to a clevis 16. The spinner blade 24 is designed so as to freely rotate about the shaft 22 even at drift-fishing velocity, namely in the range from about 1 mph to about 8 mph, and rotates more quickly as the velocity of the lure underwater increases.

A hook 18 having a hook eyelet 19 is attached to the hook-attaching eyelet 23 by releasably interlocking the eyelets to allow selection of a hook for use with a particular lure. Though a single hook is illustrated, it may be desirable, particularly with large lures, to use a double or treble hook attached to the hook-attaching eyelet 23.

As in the prior art lure illustrated, the blade 24 on its clevis 16 is spaced from the hook attaching eyelet 23 by means of colored spacer beads 17 axially slidably disposed on shaft 22. Since the number of beads and the length of the shaft will affect the action of the lure, it is preferred to have relatively few beads, preferably 3 and less than 6, so that the length of the shaft protruding from the tail is approximately the same length as the body 21.

The horizontal attitude of the lure 20 in use underwater is made possible by providing a line eyelet 25 protruding from the upper portion of the body, in the position normally occupied by the dorsal fin of a fish, and directly above the center of the mass of the minnow-shaped body, so that a fishing line attached to the line eyelet will suspend the body in the horizontal position. The fishing line attached to eyelet 25 restricts rotation of the lure about its longitudinal axis, and at the same time allows the lure to pivot laterally, that is, from side to side in a swimming motion. In the typical minnow-shaped body, the center of mass is just rearward of the mid-point of the body, though it will be readily appreciated that the center of mass will change depending upon the shape of the body.

The cavity C in the minnow-shaped body is preferably formed by molding around a generally T-shaped insert which is knocked out after the body is molded. The bent wire shaft has a line eyelet 25 formed as an integral part thereof. The wire shaft is preferably of spring wire having a diameter in the range from about 0.020 inch to about 0.062 inch in diameter and made from a corrosion resistant material. The line eyelet 25 and hook-attaching eyelet 23 are relatively small so that they are substantially rigid, the plane of the line eyelet being vertical and substantially in the same vertical plane as that through the longitudinal axis of the body. The plane in which the hook-attaching eyelet is formed is preferably in the same plane as the line eyelet 25, though neither is critical.

The eyelet 23 is an integral part of the shaft 22 and incudes a generally V-shaped portion having one arm 26 projecting at an acute angle from the horizontal. This arm 26, shown in phantom outline in FIG. 3, may be compressed to overlie the other arm of the V, namely a terminal portion of shaft 22, so as to lock the hook 18 in the eyelet 23 when the terminal spacer bead 17' is slid over the compressed arm 26.

The shaft 22 is locked in the cavity C by its T-shaped end portion, one arm of the T consisting of the line eyelet 25. The other arm of the T is a terminal U-bend 27 which is also an integral portion of shaft 22 and is formed to lie in the same vertical plane as line eyelet 25. When the T-shaped end portion of the shaft is inserted in the cavity so that line eyelet 25 protrudes above the body, U-bend 27 functions as a detent means to lock the shaft in the cavity.

To lock the hook in eyelet 23 the distance 'a' from the tail of the body 21 to the end of arm 26 must be less than the combined length of the spacer beads and clevis, shown on FIG. 3 as distance 'b'.

The body 21 is preferably made of lead, brass or other metal which is corrosion resistant. It may also be made of a heavier than water plastic synthetic resinous material which may be injection molded or otherwise formed having the cavity C. The body is desirably colored, plated or painted, preferably with eyes and the like, to resemble a minnow or other fish-attracting bait more closely, thus giving the lure an appearance as nearly life-like as the bait it is supposed to represent. The size and shape of the body will be predetermined depending upon the fish particularly sought to be attracted, as of course will be the size and shape of spinner blade, spacer beads, hook and the like. Since the foregoing are interchangeable, a precise combination of body, beads and spinner colors, and hook sizes may be used.

It will be appreciated that various changes may be made in the preferred embodiment described hereinabove without departing from the scope of the invention. Thus, for example, as is known in the art, the shaft 22 need not be a single piece construction as illustrated. Further, methods other than the clevis 16 may be devised to secure the spinner blade for free swinging rotation about the axis of the shaft protruding from the tail of the body. Still further, a variety of spacer means other than the beads 17 may be employed.

I claim:
1. An artifical lure to attract fish, comprising:
    (a) an elongate minnow-shaped body formed from a heavier-than-water material, said body having a T-shaped cavity therewithin, and a head and tail,
    (b) a line eyelet protruding above said body from about the center of mass thereof for attaching a fishing line,
    (c) a bent wire shaft having a generally T-shaped end portion the arms of which are said line eyelet and a detent means which holds the shaft in said cavity, said wire shaft being removably inserted within said cavity, said shaft extending rearwardly from said body's tail portion in generally horizontal alignment with the longitudinal axis of said body and terminating in a hook-attaching means, said line eyelet being integral with said wire shaft,
    (d) a spinner blade rotatably disposed on said wire shaft, adjacent said tail,
    (e) a fish hook attached to said hook-attaching means, and,
    (f) spacer means secured to said wire shaft for spacing said blade from said hook.
2. The artificial lure of claim 1 wherein said hook is removably disposed on said wire shaft.

* * * * *